United States Patent [19]
Morr et al.

[11] Patent Number: 5,516,331
[45] Date of Patent: May 14, 1996

[54] TORSIONALLY ELASTIC COUPLING WITH ELASTOMERIC GUIDE RING AND DAMPING RING

[75] Inventors: Jürgen Morr, Waldmichelbach; Herwig Hönlinger, Gross-Rohrheim; Jürgen Eichhorn, Weinheim, all of Germany

[73] Assignee: Firma Carl Freudenberg, Weinheim, Germany

[21] Appl. No.: 229,034

[22] Filed: Apr. 18, 1994

[30] Foreign Application Priority Data

Apr. 17, 1993 [DE] Germany ............... 43 12 577.8

[51] Int. Cl.⁶ .................................................. F16D 3/76
[52] U.S. Cl. ........................................ 464/7; 464/89
[58] Field of Search ................................. 464/7, 87, 89, 464/92, 90; 74/574

[56] References Cited

U.S. PATENT DOCUMENTS

| | | | |
|---|---|---|---|
| 3,020,036 | 2/1962 | Kleinschmidt | 464/90 X |
| 4,178,811 | 12/1979 | Shepherd | 74/574 |
| 4,307,627 | 12/1981 | Sullivan | 74/574 |
| 4,813,909 | 3/1989 | Eckel et al. | 464/87 X |
| 4,825,718 | 5/1989 | Seifert et al. | 464/89 X |
| 4,848,183 | 7/1989 | Ferguson | 74/574 |
| 5,007,304 | 4/1991 | Ide | 74/574 X |

FOREIGN PATENT DOCUMENTS

| | | | |
|---|---|---|---|
| 0682308 | 10/1939 | Germany | 464/90 |
| 0127518 | 6/1987 | Japan | 464/7 |
| 0644527 | 10/1950 | United Kingdom | 464/90 |

*Primary Examiner*—Daniel P. Stodola
*Assistant Examiner*—Emmanuel M. Marcelo
*Attorney, Agent, or Firm*—Kenyon & Kenyon

[57] ABSTRACT

A torsionally elastic coupling for a machine part rotating about an axis, comprising an inner ring open axially in one direction, which axial opening is defined by two flank surfaces and one bottom surface, and an outer ring, having an annular axial leg extending parallel to the axis, which is received in the axial opening of the inner ring, and which is supported with respect to one flank surface of the axial opening by a guide ring, and which is connected to the other flank surface of the axial opening by means of a damping ring made of elastomeric material, the guide ring and damping ring being configured integrally and continuously with one another, and made of elastomeric material.

4 Claims, 5 Drawing Sheets

TORSIONALLY ELASTIC COUPLING WITH ELASTOMERIC GUIDE RING AND DAMPING RING

BACKGROUND OF THE INVENTION

The present invention relates to a torsionally elastic coupling for a machine part rotating about an axis, comprising an inner ring, open axially in one direction, having an open space defined by two flank surfaces and one bottom surface, and an outer ring having an annular leg extending parallel to the axis and extending into the open space of the inner ring, the annular leg supported with respect to one of the flank surfaces of the axial opening of the inner ring by a guide ring and connected to the other flank surface through a damping ring made of elastomeric material.

A coupling of this kind is known from published Canadian Patent Application 2,044,094, corresponding to German Patent 40 18 596. The rings are supported with respect to one another in the radial direction by means of a separately produced and subsequently assembled bearing bushing, which allows the transfer of radial forces and promotes utilization inside belt pulleys and/or torsional vibration cancelers. The radially nested arrangement of the guide (bearing) and damping rings results in a low axial length for the coupling. The economic aspects of manufacturing, however, are less than satisfactory.

SUMMARY OF THE INVENTION

An object of the present invention is to develop a coupling of the aforesaid type that is economical to manufacture.

According to the invention, this object is achieved with the characteristics described in the claims appended hereto.

This object is achieved by the fact that the guide ring and damping ring are configured integrally and continuously with one another, and are made of elastomeric material.

Economy in manufacturing is promoted by the fact that the guide bearing and the damping element are configured integrally and continuously with one another. The guide ring and damping ring can be connected by means of an extension penetrating through the axial leg of the outer ring. It is additionally and/or alternatively possible for the guide ring and damping ring to be connected by means of a support ring surrounding the axial leg in the region of its end surface, the support ring being in contact with the bottom surface of the open space of the inner ring. This additionally results in axial support of the two machine parts against one another.

On the side facing the flank surface of the open space of the inner ring, the guide ring can have, distributed regularly in the peripheral direction, lubricant cavities filled with a lubricant, for example lubricant cavities filled with vaseline and/or grease. This noticeably improves the abrasion resistance of the guide ring.

In the simplest case, the coupling according to the invention consists of only two parts, which are particularly easy to assemble. This is of great advantage in terms of economical manufacturing of the coupling.

The elastomeric material utilized to form the guide ring and damping ring must have both good damping properties and low abrasive wear. Suitable materials have a Shore A hardness of 35 to 90, preferably 45 to 85.

The damping ring is adhesively joined to both machine parts. This guarantees consistently good damping properties over a long service life. Advantageously, the damping ring is rotationally symmetrical.

A further improvement in vibration-damping properties can be achieved by the use of an inertial ring fastened to at least one machine part by means of a second damping ring made of elastomeric material. The inertial ring and the second damping ring can be arranged in a radial plane coinciding with the damping ring and the guide ring, which prevents the occurrence of tilting moments. A configuration of this kind is highly advantageous especially for couplings rotating at high speed.

The second damping ring can be made of elastomeric material, and can be pressed with a radial preload into the annular gap between the inertial ring and the machine part rotating relative thereto. In this case, fastening is maintained exclusively on account of static friction. Adhesive bonding of the elements in contact with one another is also possible.

The second damping ring can constitute an integral component of the material body comprising the guide ring and damping ring. This arrangement makes manufacture particularly simple, requiring the use of only a single shaping tool, and guarantees excellent rotational symmetry in the ready-to-use coupling with no need for special balancing actions.

Good radial support of the machine parts against one another allows the transfer of large radial forces, which makes it possible to use the coupling inside belt pulleys and/or torsional vibration cancelers without problems. One of the machine parts can itself constitute a component of such a torsional vibration canceler and/or belt pulley. The resulting unit can be utilized in particular to drive accessories of an internal combustion engine.

If the guide ring and damping ring are connected by means of at least one extension penetrating through the axial leg of the outer ring, the result is that both rings are positively fastened to that axial leg. This is highly advantageous in terms of durability.

If lubricant cavities filled with lubricant are provided in the region of the sliding surface of the guide ring, the result is not only to reduce wear, but also to improve relative rotation capability. Because of the substantially decreased coefficient of friction, the transition from static to sliding friction occurs uniformly and gradually.

To prevent the lubricant from being prematurely lost, it has proved to be advantageous if the friction zone is axially sealed in at least one direction, with respect to the adjacent surface of the guide ring, by means of a peripheral sealing lip. Additionally, such an embodiment prevents the lubricant from contaminating the environment. Sufficient elastic pressure of the sealing lip against the machine part moving relative thereto can be achieved by dimensioning the sealing lip, when it is manufactured, so that elastic deformation occurs when it is fitted against the respective surface of the machine part. To prevent damage to the sealing lip during this process, it has proved to be advantageous if it has a toroidal profile.

DETAILED DESCRIPTION

Figure 1:
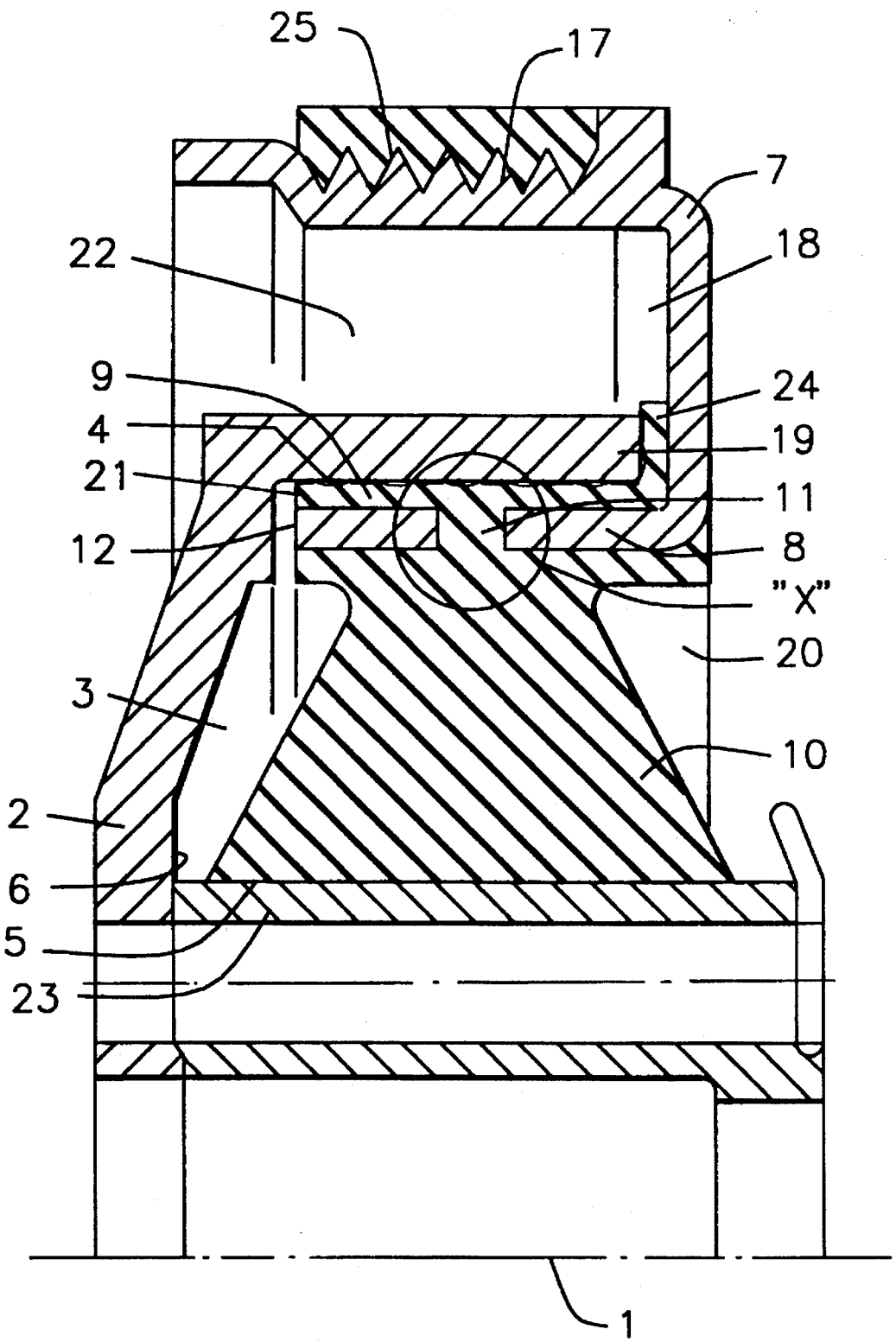
FIG. 1 shows a first embodiment of the invention in which the guide ring and damping ring are configured integrally, the guide ring comprises both a radially supporting bearing part and a one-sided axially supporting bearing part, and wherein the guide ring and damping ring are vulcanized in the same vulcanization tool.
Figure 2:
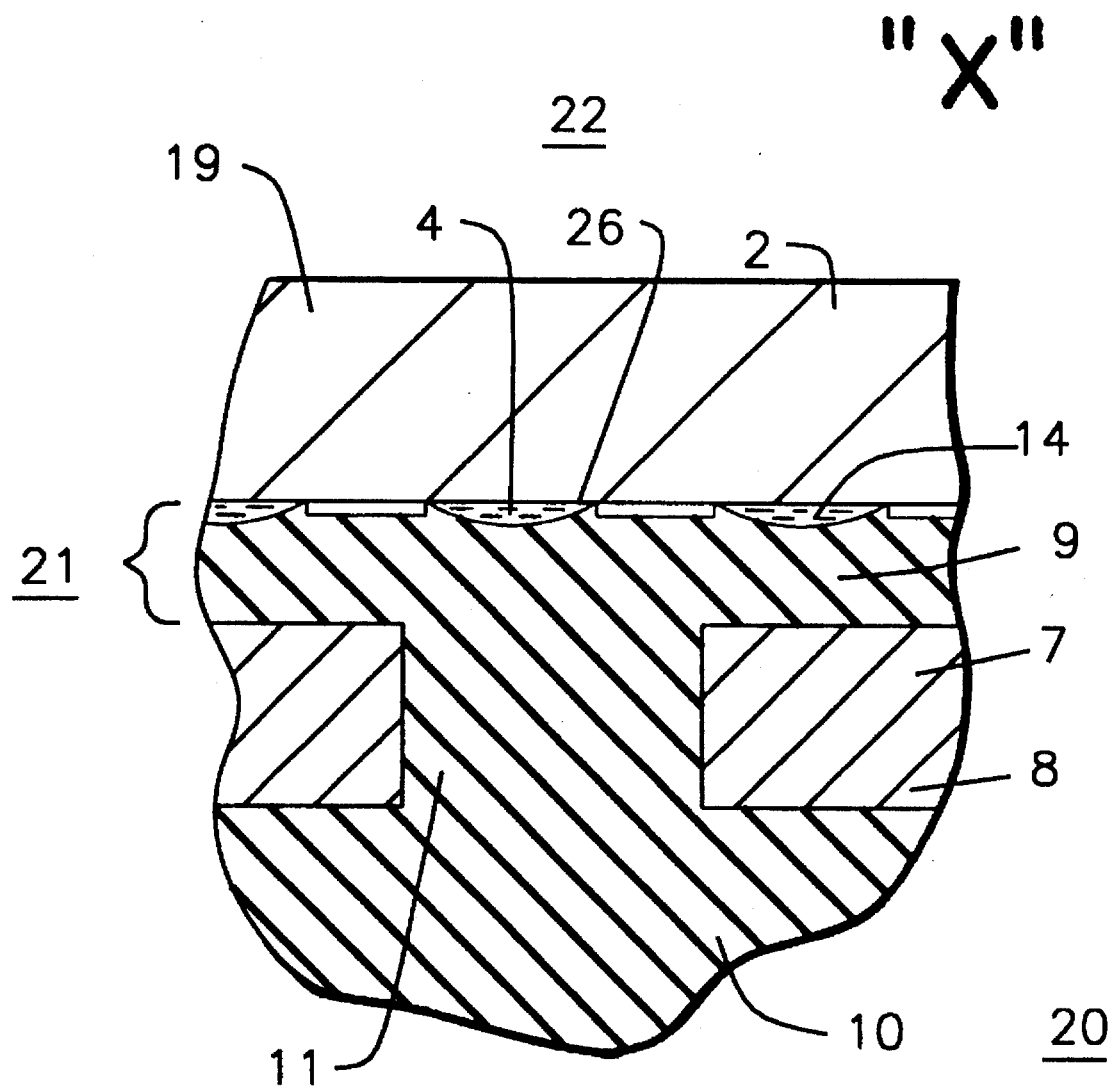
FIG. 2 depicts a portion of the coupling according to FIG. 1 in an enlarged scale.
Figure 3:
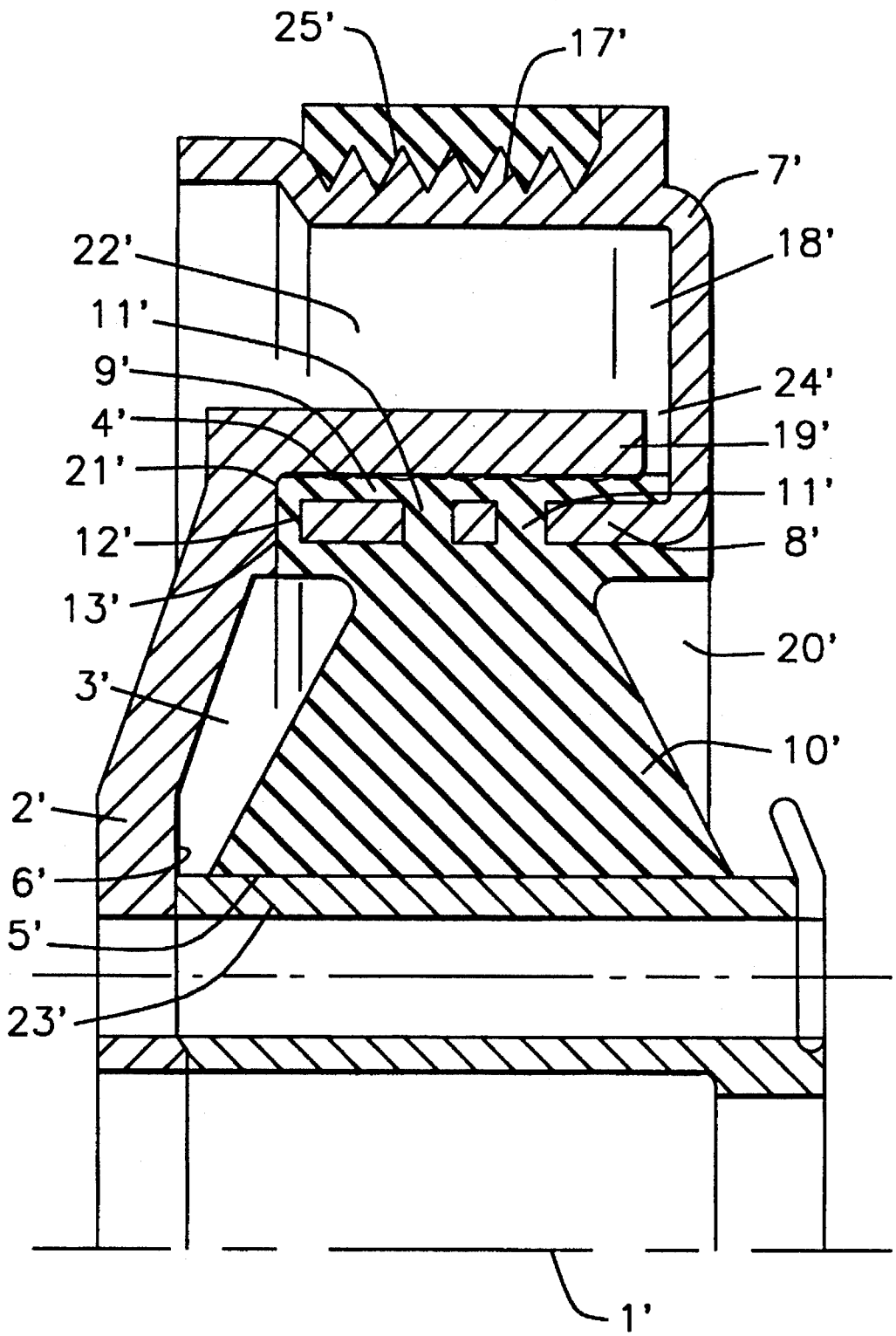
FIG. 3 shows a second embodiment of the present invention in which the guide ring and damping ring are configured integrally and continuously with one another, and the rings are also supported radially and axially against one another.
Figure 4:
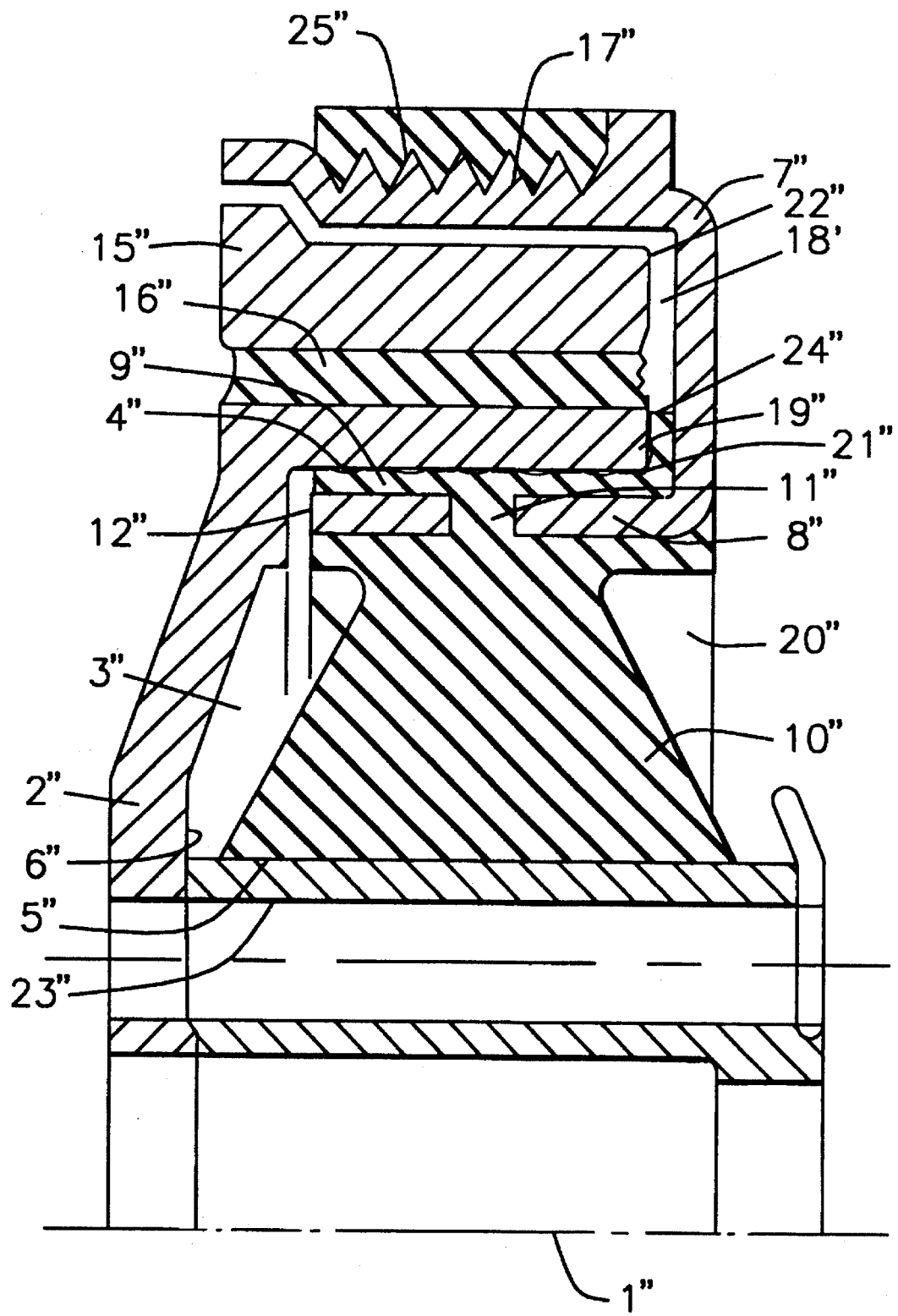
FIG. 4 shows a third embodiment of the present invention in which, in order to improve vibration-damping properties, the coupling is additionally provided with an inertial ring connected to one of the rings by means of a damping layer.
Figure 5:
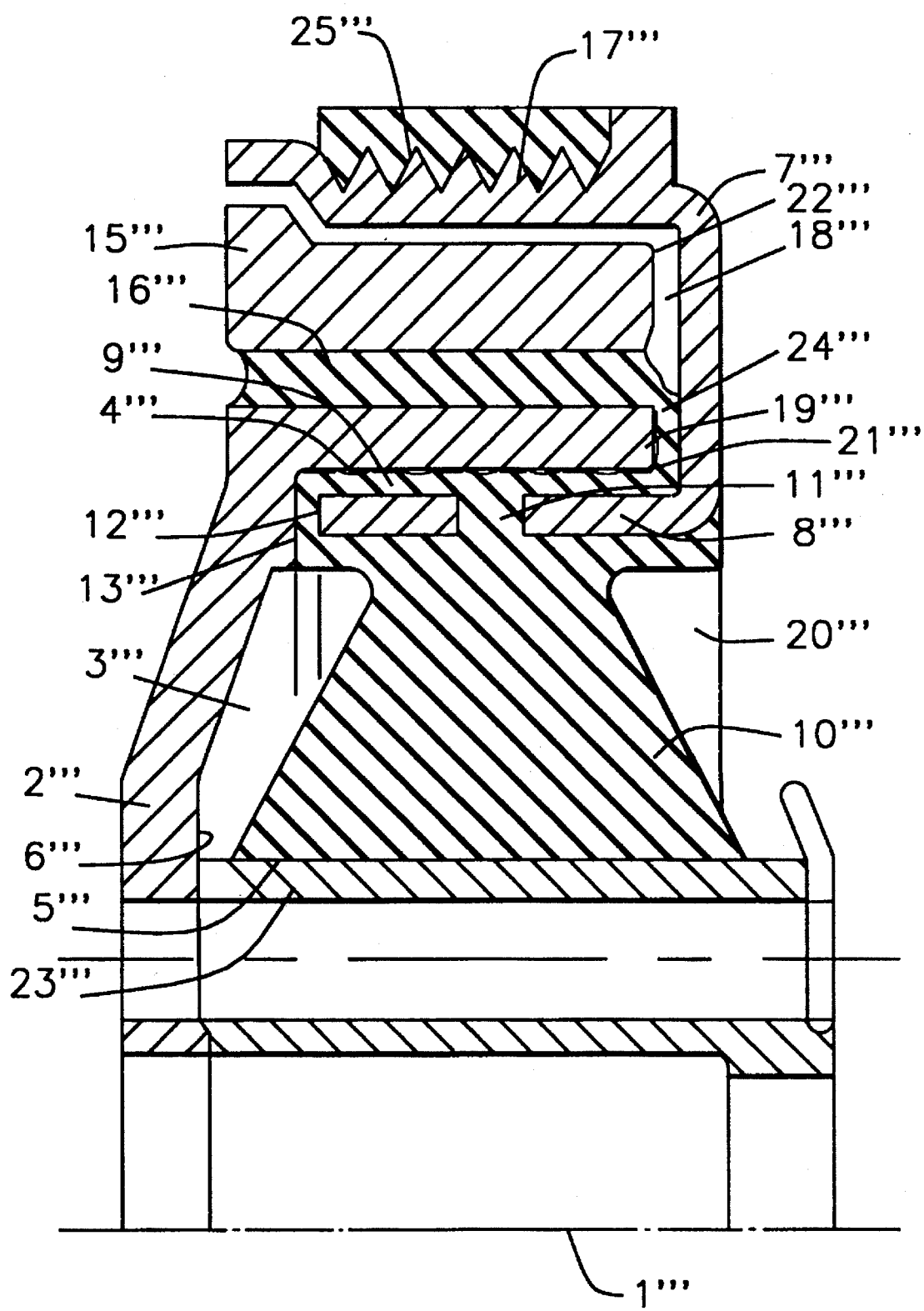
FIG. 5 shows a fourth embodiment of the present invention similar to the embodiment of FIG. 4, in which the damping layer of the inertial ring, the guide ring, and the damping ring are configured integrally and continuously with one another.

FIGS. 1 to 5 represent a selection from a number of possible variants, which are particularly useful in terms of their configuration. FIGS. 1 to 3 show torsionally elastic couplings, while FIGS. 4 and 5 show torsionally elastic couplings provided with an additional inertial ring.

FIGS. 1 to 5 show torsionally elastic couplings for two machine elements rotating about an axis 1, one of the machine elements being connected to an inner ring 2, and the other machine element to an outer ring 7. In the illustrated embodiments, inner ring 2 is configured so that it can be bolted to the first machine element. Outer ring 7 is configured as a belt pulley 17, and can be used, for example, to drive the second machine element, which for example can consist of the generator of a motor vehicle. Inner and outer rings 2, 7 are generally U-shaped, having axial openings 3, 18 that are open in opposite axial directions. Axial openings 3, 18 of inner ring 2 and outer ring 7 are each divided in the radial direction by an axially projecting leg 8, 19 of the adjacent ring 7, 2. This division results in a total of three partial spaces 20, 21, 22 surrounding one another radially.

A guide ring 9 is arranged in one of the partial spaces 20, 21, 22 and is connected to one of rings 2, 7, such that the rings 2, 7 are supported against one another at least in the radial direction. A damping ring 10 made of an elastomeric material is located, for vibration damping purposes, in one of the partial spaces 20, 21, 22 that is adjacent to the partial space in which the guide ring 9 is located. The guide ring 9 and damping ring 10 are configured integrally and continuously with one another. In the exemplary embodiments depicted here, damping ring 9 is adhesively joined to rings 2, 7. In each of the exemplary embodiments, the guide ring 9 is made of an elastomeric material.

In FIG. 1, damping ring 10 is arranged inside first partial space 20 and connects the radially innermost leg 23 of inner ring 2, at flank surface 5, to the radially innermost leg 8 of outer ring 7. The connection can be made, for example, by vulcanization. Rings 2, 7 can also, as in all other exemplary embodiments, be made of metallic or polymeric material. Guide ring 9 is arranged inside second partial space 21, guide ring 9 being connected to the radially innermost leg 8 of outer ring 7. For axial support of the two rings 2, 7 against one another, guide ring 9 has a substantially L-shaped profile and surrounds axial leg 19 of inner ring 2 in the region of its end surface 24. This exemplary embodiment provides for the sliding surface to be located between the inner peripheral surface of axial leg 19 and the outer peripheral surface of guide ring 9. Guide ring 9 and damping ring 10 are configured integrally and continuously with one another by means of an extension 11 that penetrates through axial leg 8.

FIG. 2 depicts an enlarged view of a portion of the coupling according to FIG. 1 designated by the area labeled "X". Arranged in the region of the sliding surface of guide ring 9 are lubricant cavities 14 that are filled with a lubricant. Lubricant cavities 14 are surrounded by sealing lips 26. A configuration of this kind to reduce abrasive wear can also be utilized in the embodiments according to FIGS. 3 to 5.

FIG. 3 shows an exemplary embodiment that corresponds substantially to the exemplary embodiment of FIG. 1, with like parts bearing the same reference numerals with prime (') designations. Guide ring 9' and damping ring 10' are again configured integrally and continuously with one another. Both guide ring 9' and damping ring 10' are adhesively and positively joined to axial leg 8' of outer ring 7'. Axial leg 8' possesses a plurality of openings that are distributed radially around the periphery. In this example, axial support for the two rings 2', 7' against one another is provided by the fact that end surface 12' of axial leg 8' is surrounded by elastomeric material in the form of a support ring 13'. Guide ring 9' is in rotational contact with flank surface 4' axial leg 19' of inner ring 2'. Outer ring 7' is designed as a belt pulley 17', and is encircled by a finely toothed belt 25'.

The coupling of FIG. 4 corresponds substantially to the coupling of FIG. 1, with like parts bearing the same reference numerals with double prime (") designations. Arranged inside third partial space 22" is an inertial ring 15" that is adhesively joined to axial leg 19" of inner ring 2" by means of a damping layer 16" made of elastomeric material. In this exemplary embodiment, guide ring 9" is supported against axial leg 19" in a manner allowing relative rotation, and is positively joined to axial leg 8" of outer ring 7". To allow individual adjustment of operating characteristics to the particular application, damping layer 16" and guide ring 9" are configured in two parts. A variety of materials can be utilized.

The fourth exemplary embodiment of FIG. 5 is similar to the one described above, with like parts bearing the same reference numerals with triple prime ('") designations. Damping layer 16'", guide ring 9'", and damping ring 10'" are configured integrally and continuously with one another, and are made of an identical material.

For axial support of the two rings 2'", 7'", provision is made for guide ring 9'" to cover end surface 12'" of axial leg 8'", and to be supported against bottom surface 6'" of inner ring 2'".

What is claimed is:

1. A torsionally elastic coupling for a machine part for rotation about an axis, comprising:

(a) an inner ring, having an axial opening in one direction, said axial opening defined by first and second flank surfaces of said inner ring and one bottom surface of said inner ring;

(b) an outer ring, with an annular axial leg extending substantially parallel to said axis, wherein said annular axial leg of said outer ring is received in said axial opening of said inner ring;

(c) a guide ring between said annular axial leg of said outer ring and said first flank surface of said inner ring, wherein said annular axial leg of said outer ring is supported with respect to said first flank surface of said inner ring by said guide ring and wherein said first flank surface of said inner ring is rotatable relative to a sliding surface of said guide ring; and (d) a damping ring made of elastomeric material wherein said annular axial leg of said outer ring is connected to said second flank surface of said inner ring by said damping ring;

wherein said guide ring and said damping ring are configured integrally and continuously with one another, and are made of elastomeric material.

2. The coupling according to claim 1, wherein the guide ring and the damping ring are connected to each other by at least one extension penetrating through said annular axial leg of said outer ring.

3. The coupling according to claim 1, wherein the guide ring and the damping ring are connected to each other by a support ring surrounding the annular axial leg of said outer ring in a region of an end surface, and wherein the support ring is in contact with said bottom surface of said inner ring.

4. The coupling according to claim 1, wherein on said sliding surface, the guide ring has, distributed regularly in the peripheral direction, lubricant cavities filled with a lubricant.

* * * * *